United States Patent
Ebert et al.

(10) Patent No.: US 7,602,751 B2
(45) Date of Patent: Oct. 13, 2009

(54) METHOD AND APPARATUS FOR TRANSPORTING CDMA TRAFFIC OVER A UMTS-COMPATIBLE CPRI INTERFACE

(75) Inventors: Roman S. Ebert, Phoenix, AZ (US); Warren P. Berryman, Mansfield, TX (US); Fredrick J. Bontemps, Phoenix, AZ (US); William A. Bucher, Tempe, AZ (US); Scott J. Leahy, Gilbert, AZ (US); Peter D. Novak, Keller, TX (US); William J. Walsh, Wilmington, NC (US)

(73) Assignee: Motorola, Inc., Schaumburg, IL (US)

( * ) Notice: Subject to any disclaimer, the term of this patent is extended or adjusted under 35 U.S.C. 154(b) by 600 days.

(21) Appl. No.: 11/299,864

(22) Filed: Dec. 12, 2005

(65) Prior Publication Data

US 2007/0133477 A1    Jun. 14, 2007

(51) Int. Cl.
    *H04B 7/216* (2006.01)
(52) U.S. Cl. .............................. 370/335; 370/342
(58) Field of Classification Search ............ 370/335, 370/342
    See application file for complete search history.

(56) References Cited

U.S. PATENT DOCUMENTS

| | | | |
|---|---|---|---|
| 2004/0057543 A1 * | 3/2004 | Huijgen et al. | 375/356 |
| 2005/0105534 A1 * | 5/2005 | Osterling | 370/395.43 |
| 2005/0105552 A1 * | 5/2005 | Osterling | 370/466 |
| 2005/0177641 A1 * | 8/2005 | Yamagami | 709/229 |

OTHER PUBLICATIONS

"CPRI Specification V1.1 (May 10, 2004), Common Public Radio Interface (CPRI); Interface Specification", © 2004 Ericsson AB, Huawei Technologies Co. Ltd. NEC Corporation, Nortel Networks SA and Siemens AG, pp. 1-56.

* cited by examiner

*Primary Examiner*—Barry W Taylor

(57) ABSTRACT

A base station has a processor to generate a Code Division Multiple Access ("CDMA") data frame. The CDMA data frame comprises a plurality of Basic Frames. At least one of the plurality of Basic Frames comprises a vendor-specific field. A modem transports the CDMA data frame over a Universal Mobile Telecommunications System ("UMTS")-compatible link between the base station and a remote head having a transceiver.

14 Claims, 4 Drawing Sheets

METHOD AND APPARATUS FOR TRANSPORTING CDMA TRAFFIC OVER A UMTS-COMPATIBLE CPRI INTERFACE

TECHNICAL FIELD

This invention relates generally to the transport of Code Division Multiple Access ("CDMA") traffic and other non-Universal Mobile Telecommunications System ("UMTS") traffic over a Common Public Radio Interface ("CPRI") interface.

BACKGROUND

Mobile communications networks include a plurality of base stations, each of which is in communication with an antenna. The base stations have traditionally been located close to their respective antennas. When located in close proximity, many parallel connections are used to couple a modem of the base station to a transceiver near the antenna. When the modem and the transceiver are at the same location, this is not overly burdensome.

Some systems utilize an architecture where a Transceiver and Power Amplifier ("PA") is located far away from its associated base station, possibly up to several kilometers. This potentially allows a single base station to drive several Transceiver-PA sites, saving the system operator money in terms of a base station investment as well as floor space.

Many networks utilize the Universal Mobile Telecommunications System ("UMTS") technology (one of the third-generation ("3G") mobile phone technologies), to transmit data between a base station having a modem and its respective remotely-located transceiver. The UMTS technology is commonly used in Europe.

A competing technology for transmitting data between a base station's modem and its transceiver is Code Division Multiple Access-2000 ("CDMA-2000"). CDMA-2000 is a 3G mobile telecommunications standard that uses CDMA, a multiple access scheme for digital radio, to send voice, data, and signaling data (such as a dialed telephone number) between the base stations' modems and their respective transceivers and between mobile telephones and cell sites. CDMA-2000 is often used in the U.S. and in Asia. However, CDMA-2000 is an incompatible competitor of UMTS.

Currently, a base station communicates data with its transceiver and RF antenna via a series of many parallel copper connections. When the modem and the transceiver are at the same location, this is not overly burdensome. However, when the modem and the transceiver are located apart by several kilometers, it is not practical to use such copper interconnect to couple the modem to the transceiver.

Common Public Radio Interface ("CPRI") is an interface that has been designed to transport UMTS data over a link between, e.g., a base station's modem and its remotely-located transceiver. CPRI has been utilized to transport UMTS data between a base station's modem and its remotely located transceiver when the base station's modem and the remotely located transceiver are separated by, e.g., a kilometer or more. CPRI allows use of a small cable to transfer control communication and baseband data between the modem and the transceiver. CPRI provides a high data rate over far fewer wires than would be possible with the use of a non-CPRI interface. However, no such architecture has been developed for carrying CDMA baseband data over a CPRI interface.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common and well-understood elements that are useful or necessary in a commercially feasible embodiment are often not depicted in order to facilitate a less obstructed view of these various embodiments of the present invention.

DETAILED DESCRIPTION

Generally speaking, pursuant to these various embodiments, a base station communicates CDMA-2000 data frames to a remote head. The base station has a modem and the remote head has a transceiver. The base station and the remote head may be located several kilometers apart. The base station and the remote head communicate the CDMA-2000 data frames via a CPRI interface that is normally utilized to transport UMTS data frames. The base station and the remote head communicate baseband and control data between each other. When the baseband and control data is to be transmitted between the base station and the remote RF head, the data is compiled into various frames with the largest frame having a length of about 2 seconds. The data rate of the CDMA-2000 data is matched with that of the UMTS data, and various vendor-specific information is inserted to provide enhanced functionality and ensure that only authorized base stations can communicate with the remote head.

The CPRI interface allows the transfer of both control data and baseband data via the data frame. The CPRI standard specifies a limited amount of control data being included in the data frame as control bytes. However, these teachings facilitate transmission of RSSI data in the baseband data fields. Accordingly, these teachings permit CDMA baseband data to be conveyed over a CPRI interface and hence the various benefits that are ordinarily associated with a CPRI approach are thus now rendered to a CDMA-based communications system architecture.

Figure 1:
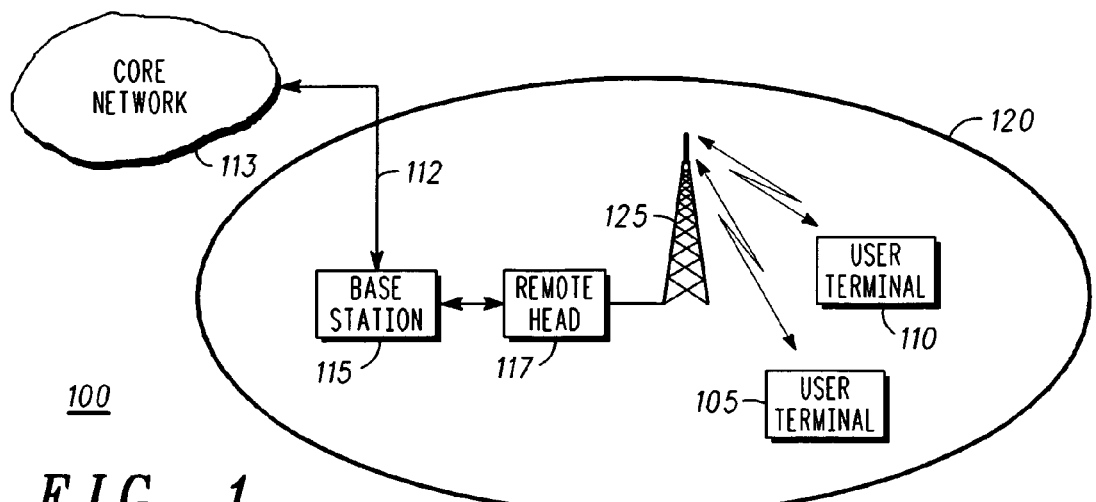
FIG. 1 illustrates a wireless network according to an embodiment of the invention.

FIG. 1 illustrates a wireless network 100 according to an embodiment of the invention. The wireless network 100 may utilize, e.g., the CDMA-2000 technology to communicate with subscribers, such as user terminal 105 and user terminal 110. User terminals 105 and 110 may be, e.g., cellular phones. Base station 115 may provide wireless service to, e.g., user terminal 105 when user terminal 105 is within cell 120. The base station 115 is typically located close to the antenna 125. However, as shown in FIG. 1, the base station 115 may be separated from the antenna by a distance of, e.g., several kilometers. In this case, the base station 115 transmits data to a remote head 117 which is in communication with the antenna 125.

The remote head 117 transmits and receives signals from the base station 115, via the antenna 125, to and from the user terminals 105 and 110. The base station 115 relays data from the user terminals 105 and 110 to the core network 113 via a backhaul link 112. When a call is made with, e.g., user terminal 105, cellular data for the call is transmitted to the core network 113 which transports the cellular data on to its final destination which may be, e.g., another base station and associated antenna providing service to another user terminal.

In the embodiment shown in FIG. 1, the base station 115 is in communication with a single antenna 125 to provide cellular service to the cell 120. However, it may be desirable for the base station to be in communication with multiple RF antennas to provide wireless service to a larger geographical area.

Figure 2:
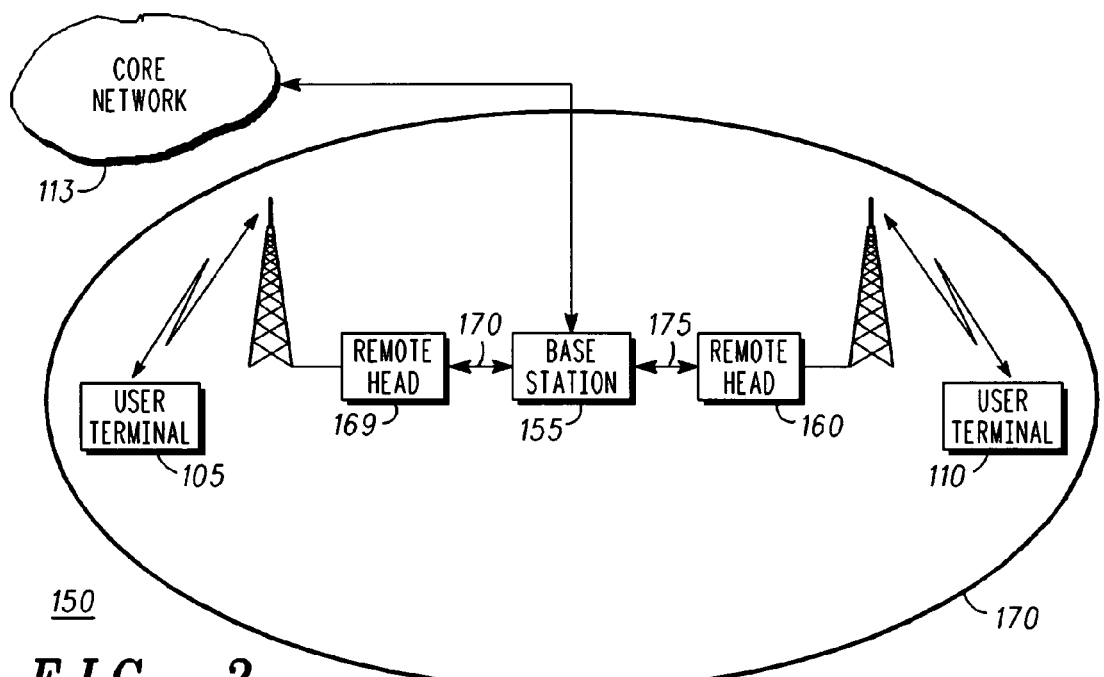
FIG. 2 illustrates a wireless network according to an embodiment of the invention.

FIG. 2 illustrates a wireless network 150 according to an embodiment of the invention. As illustrated, the wireless network includes a base station 155. The base station 155 is in communication with two remote heads 160 and 165. The base station 155 includes at least one modem to communicate with remote heads 160 and 165. The base station 155 manages data flow and resources of a cell 170 being provided with wireless service. The modem within the base station 155 generates and transmits digital baseband data in the downlink direction. The modem transmits the digital baseband data which is then received at the transceiver within either remote head 160 or remote head 165. The transceiver converts the digital baseband data into an analog signal for transmission by the antenna, as discussed below in FIG. 3.

To avoid having to use expensive and bulky copper wires to couple the base station to each of the remote heads, the links 170 and 175 are instead cables having, e.g., 4 wires. Alternatively, fiber optic links may be utilized instead of cables links 170 and 175. The cables are each capable of transmitting UMTS data frames via the CPRI standard. However, an embodiment of the invention is designed to transmit other non-UMTS technologies, such as CDMA-2000 data frames across the respective links 170 and 175. By utilizing a UMTS-compatible technology such as CPRI, the base station 155 may be physically located several kilometers from the remote heads 165 and 160 and may also provide cellular data frames to more than one remote head, such as, e.g., remote heads 160 and 165.

Figure 3:
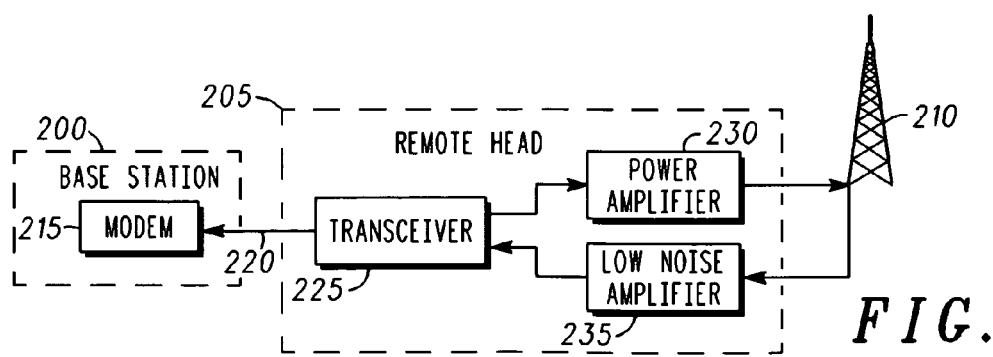
FIG. 3 illustrates a base station, remote head, and antenna according to an embodiment of the invention.

FIG. 3 illustrates a base station 200, remote head 205, and antenna 210 according to an embodiment of the invention. As shown, the base station 200 includes a modem 215. As discussed above, the modem 215 generates and transmits a digital baseband signal across a UMTS-compatible link such as a CPRI link 220, and the baseband data is received by a transceiver 225 within the remote head 205. Although only a single modem 215 is illustrated, multiple modems may also be utilized. For example, there may be multiple modems within the base station 200 which all connect to a modem interface that provides the CPRI link. The transceiver 225 is also in communication with a power amplifier 230 and a low noise amplifier 235. The transceiver 225 receives the digital baseband data and converts it to an analog signal and outputs it to the power amplifier 230 which greatly increases the signal's strength and then outputs the amplified signal to the antenna 210 which transmits the signal. Whenever a signal is received at the RF antenna 210 by, e.g., a user terminal within the cell serviced by the base station 200, the signal is output by the antenna 210 to the low noise amplifier 235, which amplifies the portions of interest in the received signal and outputs the amplified received signal to the transceiver 225. The transceiver 225 subsequently converts the amplified received signal into a digital baseband signal and transports the signal back to the modem 215 at the base station 200 over the CPRI link 220.

An embodiment of the invention transports 2-second data frames between a base station and a remote head. The large 2-second frame is comprised of 200 Node B frames, each having a length of about 10 msec. Each Node B frame is comprised of 150 Hyperframes, each having a length of about 66.67 usec. The Hyperframes are comprised of 256 Basic Frames. The first portion of each of the Basic Frames, e.g. the first 16 bits, are control data. The control data on some of these Basic Frames include vendor-specific fields. The vendor-specific fields are utilized so that when the 2-second frame is transmitted from, e.g., the base station to the remote head, the remote head has to extract the correct vendor-specific field, such as a vendor-specific identifier ("ID"), in order to process the data in the 2-second frame. In other words, the vendor-specific fields may be utilized to ensure that only authorized base stations can communicate data with the remote head.

CDMA-2000 has a chipping rate of 1.2288 Mbps, but UMTS has a chipping rate of 3.84 Mbps. However, as discussed above, the CPRI standard was designed for the transmission of UMTS data frames. Accordingly, the data rate of the CDMA-2000 are beneficially matched with the data rate of the UMTS in order to transmit a CDMA-2000 data frame over a CPRI link. According to the CPRI specification, one of the supported line bit rates of the link between the base station and the remote head is 1.2288 Gbps. The duration of a Basic data Frame for being transmitted across the link is defined according to inverse of the UMTS chip rate, 3.84 MHz, which is about 260.4166667 nsec. For the 1.2288 Gbps line rate, a Basic Frame consists of 16 words, each 16 bits in length. The first word of each Basic Frame are control bits, and the remaining 15 words are dedicated for U-plane IQ data blocks.

An embodiment of the invention defines a Receive Signal Strength Indicator ("RSSI") value that is supported for every antenna carrier ("AxC") on a 512 chip interval. The RSSI data is mapped into a normally NULL Uplink AxC location within a Basic Frame. The RSSI data must be formatted correctly within a 24-bit allocation. The RSSI data is a 12-bit number utilizing the 12 most significant bits.

The AxCs are mapped within a Basic Frame using the packed position option of the CPRI specification. When the prescribed AxC Containers have all been sent for a particular frame, NULL, RSSI, or reserved bits are sent. Unused AxC Containers contain NULL data.

The CDMA-2000 data rate is mapped onto the UMTS-defined CPRI specification by re-defining the way in which the AxCs are mapped within the Basic Frame and across consecutive Basic Frames. The number and duration of Basic Frames has not been changed. However, each Basic Frame does not map to the same set of AxCs. Instead, the 24 supported AxCs are mapped consecutively across three Basic Frames (8 AxC each) with a NULL Basic Frame occurring every 25 Basic Frames. This translates to 8 CDMA chips (25/3=8+1 NULL) worth of AxC data every 25 Basic Frames which accomplishes the conversion between the two radio interface chip rates that have a ratio if 3.84 MHz/1.2288 MHz=25/8.

Figure 4:
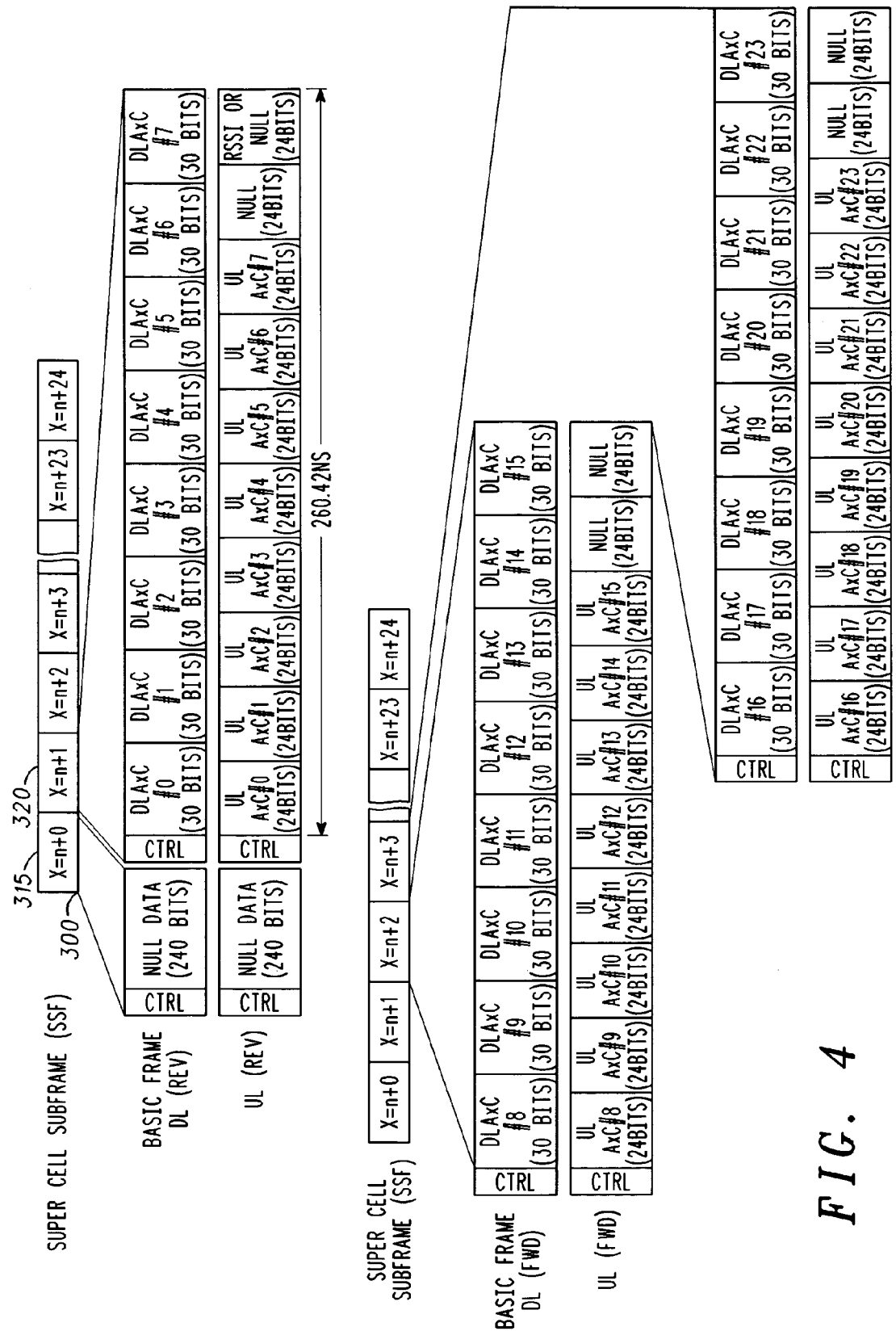
FIG. 4 illustrates the mapping of the AxC Container across Basic Frames according to an embodiment of the invention.

FIG. 4 illustrates the mapping of the AxC Container across Basic Frames according to an embodiment of the invention. As shown, a Super Cell Subframe 300 is comprised of 25 Basic Frames, labeled X=n+0 to X=n+24. The super cell subframe 300 has a length of about 6.51 usec, and each of the Basic Frames have a length of about 260.4 nsec. Each Basic Frame carries 256 bits of data, the first 16 of which are Control ("CTRL") data, and the remaining of which are the baseband data. FIG. 4 illustrates the components of a Basic Frame of the downlink ("DL"), as well as the components of a Basic Frame on the uplink ("UL"). As shown, in the first Basic Frame 315, i.e., X=n+0, in order to match the data rates of the CDMA-2000 to the UMTS, as discussed above, the first 240 baseband data bits of the UL and DL Basic Frames are NULL data.

In the second Basic Frame 320, X=n+1, the first 16 bits comprise the CTRL data, followed by 8 30-bit amounts of data for AxC#0-AxC#7 for the DL Basic Frame, or 7 24-bit amounts of data for AxC#0-AxC#7 followed by 24 NULL bits and an additional 24 bits of NULL or RSSI for the UL Basic Frame.

Accordingly, as discussed above, the CTRL data consists of 16 bits. The Basic Frame formats for X=n+1, X=n+2, and X=n+3 repeat 8 times within the Super Cell Subframe 300. Each DL Basic Frame AxC container contains 1 sector-carrier of data consisting of 15 bits I and 15 buts Q at the CDMA 1X chip rate. Each UL AxC container contains 1 sector-carrier (without diversity) of data consisting of 6 bits I and 6 bits Q at twice the CDMA 1X chip rate. The AxC containers in the DL Basic Frame and the UL Basic Frame may contain data formatted per Section 4.2.7.2 of the CPRI Specification V1.0. The RSSI Data insertion sequence is repeated every 64 Super Cell Subframes 300. The RSSI is mapped into the UL Basic Frames 310 in place of NULL data as illustrated in FIG. 4. The RSSI value for a particular AxC is mapped into the correct location, e.g., as set forth below in Table 1.

TABLE 1

| Super Cell Subframe No. | Super Cell Subframe No. (Cont.) | RSSI Value |
| --- | --- | --- |
| N × 64 + 0 | 0, 64, 128, 192 | Null Data |
| N × 64 + 1 | 1, 65, 129, 193 | Null Data |
| N × 64 + 2 | 2, 66, 130, 194 | Null Data |
| N × 64 + 3 | 3, 67, 131, 195 | Null Data |
| N × 64 + 4 | 4, 68, 132, 196 | UL AxC 0 |
| N × 64 + 5 | 5, 69, 133, 197 | UL AxC 1 |
| N × 64 + 6 | 6, 70, 134, 198 | UL AxC 2 |
| N × 64 + 7 | 7, 71, 135, 199 | UL AxC 3 |
| N × 64 + 8 | 8, 72, 136, 200 | UL AxC 4 |
| ... | ... | ... |
| N × 64 + 27 | 27, 91, 155, 219 | UL AxC 23 |
| N × 64 + 28 | 28, 92, 156, 220 | Null Data |
| N × 64 + 29 | 29, 93, 157, 221 | Null Data |
| ... | ... | Null Data |
| N × 64 + 63 | 63, 127, 191, 155 | Null Data |

Figure 5:
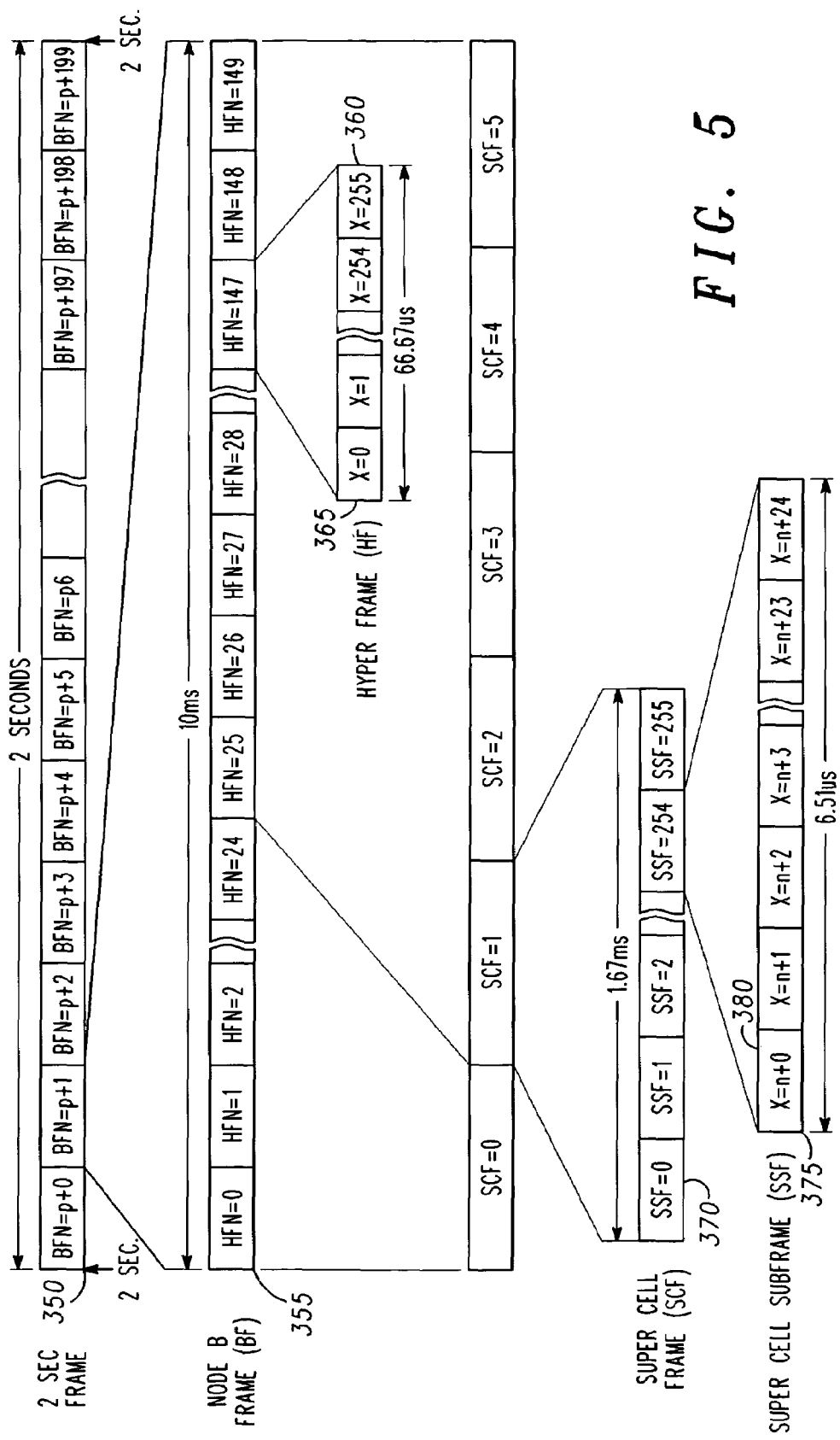
FIG. 5 illustrates a frame structure for a CDMA-2000 data frame according to an embodiment of the invention.

FIG. 5 illustrates a frame structure for a CDMA-2000 data frame according to an embodiment of the invention. As illustrated, an embodiment of the invention utilizes a 2-second frame 350 when the data is transmitted between the base station and the remote head. The 2-second length has been selected for optimal performance with CDMA-2000. The 2-second frame 350 includes 200 Node B frames 355, each of which has a duration of 10 msec. Each of the Node B frames 350 consist of 150 Hyperframes 360 each having a length of 10 msec/150 Hyperframes 360, or about 66.67 usec. Each of the Hyperframes 360 consist of 256 Basic Frames 365, each having a length of about 260.4 nsec. The Basic Frames 365 have the same length as the Basic Frames 315 shown above with respect to FIG. 4. There are a total of 7,680,000 Basic Frames 365 (i.e., (256 Basic Frames 365)×(150 Hyperframes 360)×(200 Node B frames 355)) in a 2-second frame 350.

The 2-second frame 350 is partitioned into a CDMA-2000 data frame compliant with the CPRI Standard Specification. Each of the Node B frames 350 are partitioned into 6 Super Cell Frames 370 (denoted SCF=0 through SCF=5). The Super Cell Frames 370 each have a length of about 1.67 msec (i.e., the 10 msec of the Node B frame 355 divided by 6). 25 of the Hyperframes 360 discussed above are equivalent to one of the Super Cell Frames 370. Each of the Super Cell Frames 370 include 256 Super Cell Subframes 375, as illustrated. Each of the Super Cell Subframes 375 may have a length of about 6.51 usec (i.e., 1.67 msec per Super Cell Frame 370/256 Super Cell Subframes 375). Each of the Super Cell Subframes 375 may be equivalent to the Super Cell Subframes 300 shown in FIG. 4. The Super Cell Subframes 375 consist of 25 Basic Frames 380 each having a length of about 260.4 nsec (i.e., 6.51 usec length of Super Cell Subframes 375/25 Basic Frames 380). There are a total of 7,680,000 Basic Frames 380 (i.e., (25 Basic Frames 380)×(256 Super Cell Subframes 375)×(6 Super Cell Frames 370)×(200 Node B frames 355)) in the 2-second frame 350 in the CDMA-2000 format.

Accordingly, the frame structures shown in FIGS. 4 and 5 provide a structure for formatting data that meets that CPRI specification and can be used to transmit CDMA-2000 data frames across a CPRI link even though the CPRI specification is directed to UMTS, not CDMA-2000. Moreover, RSSI data that would normally be sent as CTRL data, or not sent at all if it is larger than the allotted number of bits for CTRL data, can be sent in the NULL fields on of the UL Basic Frames. Therefore, the formatting of the data into the CDMA-2000 data frames described in FIGS. 4 and 5 is beneficial in that unlike current systems, the CDMA-2000 data frames may be transmitted across a CPRI link.

Moreover, this formatting also provides the use of vendor-specific fields. These vendor-specific fields may be utilized for redundancy management support. For example, there may be multiple CPRI links between a remote head and its associated base station. One of these is primarily used at a particular time. However, in the event that the primary link fails, one of the other backup links will be used instead to transport the data. Vendor-specific control data corresponding to the Port Identifier ("ID") and the selected link may be transported in the vendor-specific fields. The vendor-specific fields may also include information such as various identifiers to ensure that the remote head can only communicate with a base station supplying the correct identifiers. The vendor-specific fields are utilized so that when the 2-second frame is transmitted from, e.g., the base station to the remote head, the remote head has to extract the correct vendor-specific field to receive the 2-second frame timing.

Figure 6:
FIG. 6 illustrates an example of a Hyperframe according to the Common Public Radio Interface ("CPRI") standard.

FIG. 6 illustrates an example of a Hyperframe 360 according to the CPRI Standard. As illustrated in FIG. 6, and in FIG. 5, the Hyperframe includes 256 Basic Frames 365. The first 16 bits of each basic Frame 360 comprise CTRL data, as discussed above. The CTRL data for each Basic Frame is known as a "Control Word" and are broken into 64 subchannel Numbers and an associated index number X.

Table 2 shown below illustrates an example of a various subchannels and index Xs. The index X of a given control word is given by X=Ns+64*Xs.

TABLE 2

| Subchannel Number Ns | Purpose | Xs = 0 | Xs = 1 | Xs = 2 | Xs = 3 |
| --- | --- | --- | --- | --- | --- |
| 0 | Sync & Timing | Sync byte K28.5 | HFN | BFN-low | BFN-high |
| 1 | Slow C&M | Slow C&M | Slow C&M | Slow C&M | Slow C&M |
| 2 | L1 inband Protocol | version | version | version | version |
| 3 | Reserved | Reserved | Reserved | Reserved | Reserved |
| ... | ... | ... | ... | ... | ... |
| 15 | Reserved | Reserved | Reserved | Reserved | Reserved |
| 16 | Vendor Specific | 2 sec FLAG | Vendor Specific | Vendor Specific | Vendor Specific |
| 17 | Vendor Specific | Port ID/Link Sel. | Frame/RE Type | Vendor Specific | Vendor Specific |
| 18 | Vendor Specific | Version number | Vendor Specific | Vendor Specific | Vendor Specific |
| ... | Vendor Specific | ... | ... | ... | ... |
| p-1 | Vendor Specific | Vendor Specific | Vendor Specific | Vendor Specific | Vendor Specific |
| Pointer p | Fast C&M | Fast C&M | Fast C&M | Fast C&M | Fast C&M |
| ... | ... | ... | ... | ... | ... |
| 63 | Fast C&M | Fast C&M | Fast C&M | Fast C&M | Fast C&M |

As illustrated, there are a number of different CTRL words that can be utilized. There are several vendor-specific CTRL words, as well as a number of predefined CTRL words such as, e.g., those for SYNC & Timing, Slow C&M, L1 inband Protocol, and Fast C&M.

Subchannel 0 is dedicated for providing synchronization and timing information. There fields are defined by the CPRI specification and are summarized below. The UMTS Node B Frame number is also used in the CDMA-2000 implementation to provide consistency with other implementations.

Subchannel 2 is defined as the L1 inband protocol contained within the CPRI specification. The HDLC options of either 240, 480 or 960 kbps may be provided by the base station and acknowledged by radio equipment at the remote head during the startup sequence. Filtering of the reset bit on the forward link is a majority 5 decision as defined within the CPRI specification.

Both the slow C&M Channel, based upon HDLC, and the fast C&M Channel, based on Ethernet, are also allowed. Selection of the C&M Channel type is based on program requirements. For the Slow C&M Channel, a 960 kbit/s HDLC data rate is utilized. For the Fast C&M Channel, the CTRL words used for the Ethernet packets are dependent upon the pointer value (see Table 2 to determine applicable X values for a given pointer value).

According to an embodiment of the invention, subchannel number 16 defines 2-second frame timing. The "2 Sec FLAG" indicates that the start of the next Hyperframe 360 marks the 2-second reference. This flag should only occur during the 149th Hyperframe 360 (i.e., the last Hyperframe 360 of a Node B frame 355.

According to an embodiment of the invention, subchannel number 17 with index Xs=0 is utilized to make the Link selection and provide the Port ID for redundant link purposes. These Port ID/Link selection slot ID bits provide connectivity information to higher layers. On the downlink, subchannel 17 with index Xs=1, the Frame Type is sent by the base station to provide the type of frame the radio equipment in which the remote head is installed. The RE type field is sent by the radio equipment of the remote head to indicate the type of radio equipment that is currently installed.

According an embodiment of the invention, subchannel 18 defines a vendor-specific field version number. This may be utilized to support compatibility with future enhancements to vendor-specific field definitions.

Accordingly, as discussed above, an embodiment of the invention provides a method, apparatus, and system for transporting CDMA-2000 data frames over a CPRI link, thereby allowing a base station to be located to a remote head having a transceiver in communication with an antenna for providing wireless service to a cell. Moreover, because the base station remote heads are remotely located from the base station, a single base station may provide service to multiple remote heads. The CDMA-2000 data frames also include various vendor-specific fields which can be utilized for redundant link selection and to prevent operability between an unauthorized base station and a remote head.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method, comprising:
    generating a Code Division Multiple Access ("CDMA") data frame, the CDMA data frame comprising a plurality of Basic Frames, at least one of the plurality of Basic Frames comprising a vendor-specific field and a baseband data field, wherein the baseband data field comprising Receive Signal Strength Indication ("RSSI") data wherein the RSSI data is mapped into the CDMA data frame in place of NULL data; and
    transporting the CDMA data frame as an uplink data frame over a Universal Mobile Telecommunications System ("UMTS")-compatible link between a base station having a modem and a remote head having a transceiver.

2. The method of claim 1, wherein the UMTS-compatible link comprises a Common Public Radio Interface ("CPRI") link.

3. The method of claim 1, wherein the data frame has a length of about 2 seconds.

4. The method of claim 1, wherein the vendor-specific field comprises an item selected from a group consisting of: a port identifier ("ID"), a link selection, a Vendor Version Number, and a Base Station/Radio Equipment Type.

5. The method of claim 1, wherein the plurality of Basic Frames comprise control data and baseband data.

6. A base station, comprising:
a processor to generate a Code Division Multiple Access ("CDMA") data frame, the CDMA data frame comprising a plurality of Basic Frames, at least one of the plurality of Basic Frames comprising a vendor-specific field and a baseband data field, wherein the baseband data filed comprising Receive Signal Strength Indication ("RSSI") data and maps the RSSI data into the CDMA data frame in place of NULL data; and
a modem to transport the CDMA data frame as an uplink data frame over a Universal Mobile Telecommunications System ("UMTS")-compatible link between the base station and a remote head having a transceiver.

7. The base station of claim 6, wherein the UMTS-compatible link comprises a Common Public Radio Interface ("CPRI") link.

8. The base station of claim 6, wherein the data frame has a length of about 2 seconds.

9. The base station of claim 6, wherein the vendor-specific field comprises an item selected from a group consisting of: a port identifier ("ID"), a link selection, a Vendor Version Number, and a Base Station/Radio Equipment Type.

10. A system, comprising:
a base station in communication with a remote head to provide wireless service to at least one user terminal, wherein the base station has a modem and the remote head has a transceiver; and
a baseband Universal Mobile Telecommunications System ("UMTS")-compatible data link to transport a Code Division Multiple Access ("CDMA") data frame as an uplink data frame between the base station and the remote head, the CDMA data frame comprising a plurality of Basic Frames and a base band data field, wherein the baseband data field comprising Receiving Signal Strength indication ("RSSI") data mapped into the CDMA data frame in place of NULL data, at least one of the plurality of Basic Frames comprising a vendor-specific field.

11. The system of claim 10, wherein the baseband UMTS-compatible link comprises a Common Public Radio Interface ("CPRI") link.

12. The system of claim 10, wherein the data frame has a length of about 2 seconds.

13. The system of claim 10, wherein the vendor-specific field comprises an item selected from a group consisting of: a port identifier ("ID") and a link selection.

14. The system of claim 10, wherein the vendor-specific field comprises an item selected from a group consisting of: a Vendor Version Number and a Base Station/Radio Equipment Type.

* * * * *